April 4, 1950     C. H. MOULD     2,502,981
COLLET OPERATING MECHANISM

Filed Oct. 18, 1948     2 Sheets-Sheet 2

Inventor:-
Charles H. Mould,
By
Smith, Michael and Gardiner,
Attorneys.

Patented Apr. 4, 1950

2,502,981

UNITED STATES PATENT OFFICE 2,502,981

COLLET OPERATING MECHANISM

Charles Harry Mould, South Yardley, Birmingham, England

Application October 18, 1948, Serial No. 55,172
In Great Britain October 24, 1947

13 Claims. (Cl. 279—75)

This invention relates to collet operating apparatus for lathes and similar work rotating machines.

The common practice with regard to the gripping member in the work spindle of lathes is to use bell crank levers (commonly referred to as toggles) to cause the relative motion of either the collet or the collet closing sleeve to grip the work.

The object of this invention is to provide a new type of toggle apparatus to replace those commonly used and to provide a preferred modification of the construction shown in our British Patent specification No. 614,905. It has been found in practice that when the apparatus as embodied in some of the arrangements described in our said British Patent specification (as in Figures 7, 8, 9 and 10 thereof, where two pairs of reaction rollers controlled by pressure rollers actuated by a common cam are disposed parallel to one another) is used on the spindle of a lathe rotating at high speeds, the centrifugal forces are such that the pressure rollers tend to remain in contact with the reaction rollers when the cams are withdrawn which hinders the instantaneous opening of the collet, and it is necessary to use springs or other means to urge the pressure rollers out of engagement at speeds of about 6,000 R. P. M. or higher.

It is therefore additionally an object of this invention to provide a mechanism in which the beforementioned faults will be minimised or obviated.

The invention consists in a collet-operating device for a lathe and like work-rotating machine wherein rollers are employed for effecting movement of a part of the collet-operating mechanism along or parallel to the rotational axis thereof, and wherein the axes of said rollers, when extended, pass through the rotational axis of the collet.

The invention further consists in a collet-operating device for a lathe or like machine comprising coacting axially parallel rollers, relatively movable to operate as a toggle device, and disposed in cages on the machine spindle in such a manner that centrifugal forces arising from rotation of the machine spindle do not materially act upon the rollers in the direction of their relative movement which provides the aforesaid toggle action.

The invention will be further described in detail by reference to the accompanying drawings, and wherein.

Figure 1:
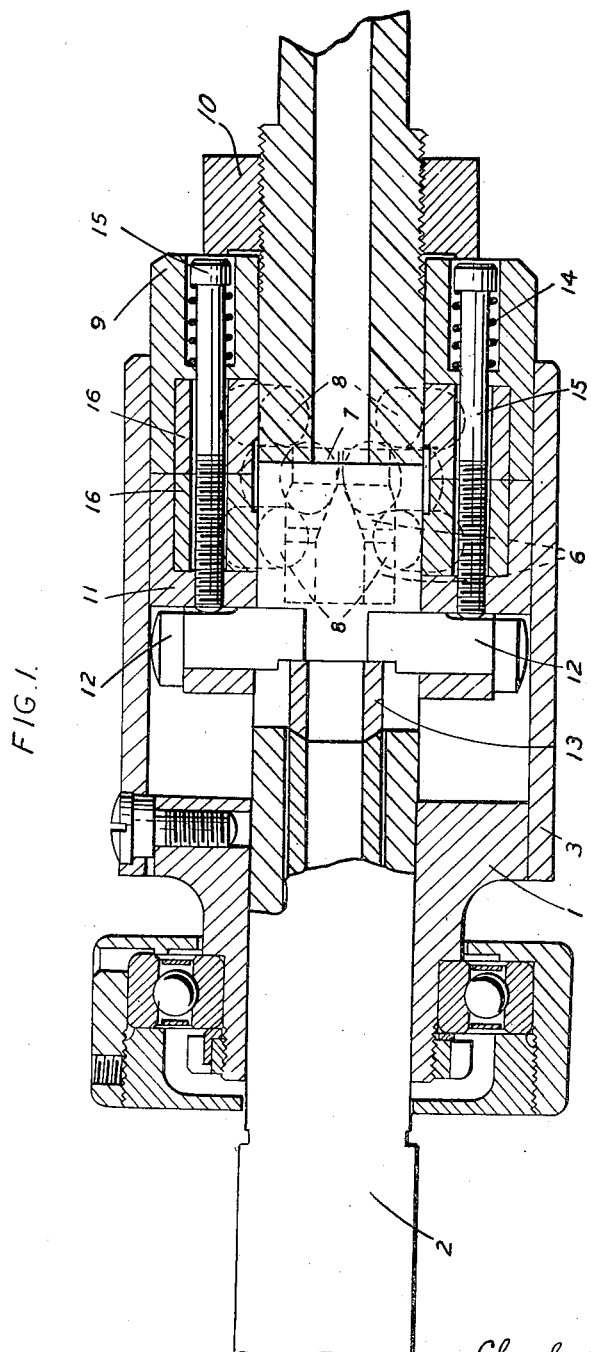
Figure 1 is a side elevation, partly in section showing the detailed construction of the collet-operating mechanism of the present invention.

In carrying the invention into effect in one convenient manner, as shown in the aforesaid drawings, there is provided an operating spool 1 slidably mounted about the spindle 2 of the lathe, and being movable longitudinally of said spindle by a yoke or any other suitable operating mechanism (not shown) of known construction. Attached to the spool 1 is a sliding sleeve 3 which encircles the fixed and movable body members and contains the rollers and cams to be hereinafter described.

Co-operating with the sleeve 3 through pins 4 fixed to spool 1 (see Figure 2), are cams 5. In this construction, there are two cams 5 each of truncated triangular cross-section in their operative parts and having tapered faces 6 adapted to co-operate with pressure rollers 7 which are themselves intended to be forced between, and thus to separate, reaction rollers 8.

The reaction rollers 8 are contained in cages 16, and each of said rollers is associated, respectively, with a different part of the relatively movable body members 9 and 11. One roller 8 coacts with the body member 9 which is fixed and prevented from end-wise movement by the adjusting nut 10 screwed to the spindle 2, adjustment for tension or wear being made by screwing the nut 10 along the spindle 2. The other roller 8 of each pair coacts with the body member 11 which is adapted to slide as a whole upon the outer diameter of the spindle 2 and is linked by pins 12 which pass through slots cut in the walls of the spindle 2 to the collet tube 13 which slides in the bore of the spindle 2. The collet tube 13 is then connected either to the collet in one form of mechanism, or to the collet closing sleeve in another form of mechanism, according to normal practice.

The sliding member 11 is normally held in contact with the fixed member 9 by compression springs 14 and screws 15, thus tending to retain the two parts together in the position shown in the drawings.

In use, the spool 1 together with the sliding sleeve 3, is moved to the right as seen in the drawings by known means which causes, through the pins 4, the cams 5 to move between the pressure rollers 7. The tapered faces 6 of the cams 5 force the pressure rollers 7 between the pairs of reaction rollers 8. The sliding body member 11 is thus separated from the fixed body member 9, whereupon the collet tube 13 is moved to the left as desired.

In order to operate the cams 5 in the reverse direction so as to release the gripping device, pins 17 associated with the sliding sleeve 3 are let in so as to abut against the end of the cam 5 and to withdraw the cams on the return motion of the spool 1.

Figure 2:
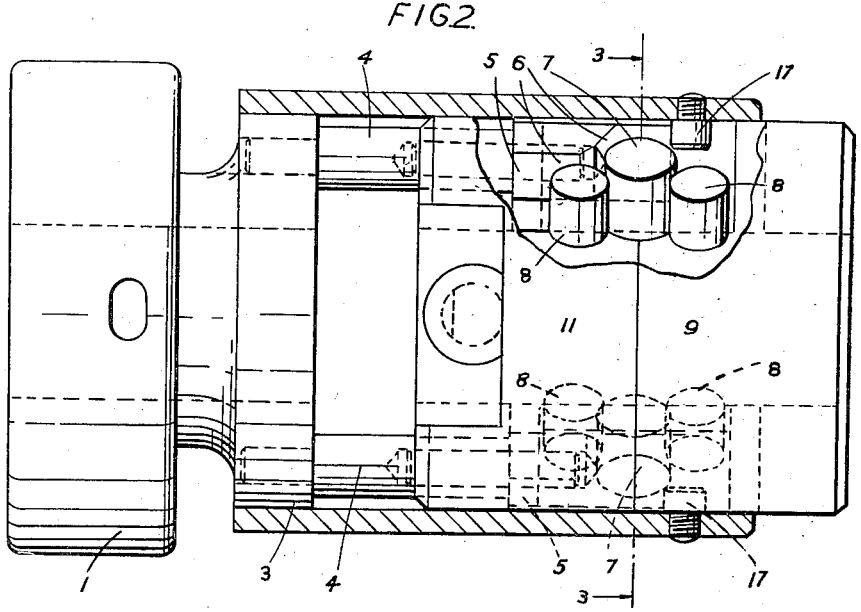
Figure 2 is a fragmentary side elevation, partly in section, showing certain portions of the mechanism in perspective, and, Figure 3 is a transverse sectional view on line 3—3 of Figure 2.

The tapered operating surfaces 6 of the cams 5 are not of a continuous taper, but are so shaped that when the pressure on the spool 1 is released, the reactionary pressure back through the pressure rollers 7 cannot force the cams 5 to the left as viewed in Figures 1 and 2. The mechanism is self-locking until the cams are forcibly withdrawn to the left (as viewed in Figures 1 and 2), by the pins 17.

Figure 3:
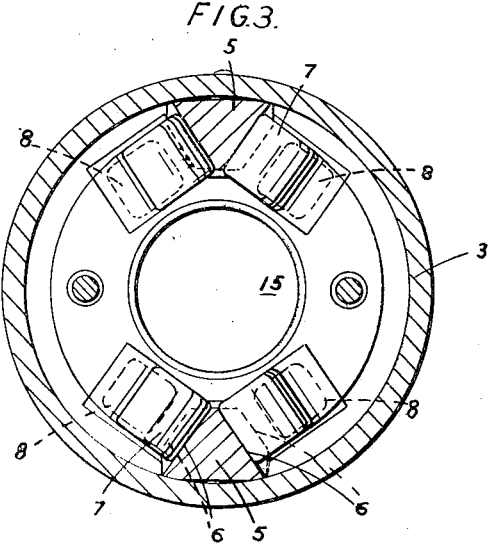

It will be seen from Figure 3 that the axes of the reaction rollers 8, when produced, all pass through the centre 15 of the lathe and thus high speed rotation in either direction will only encourage endwise movement of the reaction rollers 8 on their own axes (which movement is prevented by their housings), and will tend to throw the pressure rollers 7 towards the cams 5 and away from the reaction rollers 8. Thus the centrifugal forces set up by high speed operation do not affect, except to assist slightly, the instantaneous release of the mechanism.

What I claim is:

1. Operating mechanism located between two parts of a collet, of which one part is fixed to the shaft of a work-rotating machine and the other part is slidable axially of the shaft in relation to the first-mentioned part, comprising a reaction roller mounted in said fixed part of the collet with its axis, when extended, intersecting the rotational axis of the collet, a reaction roller mounted in said slidable part of the collet with its axis, when extended, intersecting the rotational axis of the collet, a pressure roller axially parallel to and in contact with said reaction rollers, and means for forcing said pressure roller between said reaction rollers in order to move them further apart and thereby effect relative axial movement of the said collet parts in which they are mounted.

2. Operating mechanism located between two parts of a collet, of which one part is fixed to the shaft of a work-rotating machine and the other part is slidable axially of the shaft in relation to the first-mentioned part, comprising a reaction roller mounted in said fixed part of the collet with its axis, when extended, intersecting the rotational axis of the collet, a reaction roller mounted in said slidable part of the collet with its axis, when extended, intersecting the rotational axis of the collet, a pressure roller axially parallel to and in contact with said reaction rollers, and cam means for forcing said pressure roller between said reaction rollers in order to move them further apart and thereby effect relative axial movement of the said collet parts in which they are mounted.

3. Operating mechanism located between two parts of a collet, of which one part is fixed to the shaft of a work-rotating machine and the other part is slidable axially of the shaft in relation to the first-mentioned part, comprising a reaction roller mounted in said fixed part of the collet with its axis substantially perpendicular to said shaft axes, a reaction roller mounted in said slidable part of the collet with its axis substantially perpendicular to said shaft axis, a pressure roller axially parallel to and in contact with said reaction rollers and means for forcing said pressure roller between said reaction rollers in order to move them further apart and thereby effect relative axial movement of the said collet parts in which they are mounted.

4. Operating mechanism according to claim 2 comprising two sets of reaction rollers, two pressure rollers, one associated with each set of reaction rollers, and cam means common to said two pressure rollers for forcing them respectively between their sets of reaction rollers.

5. Operating mechanism according to claim 2 comprising two sets of reaction rollers, two pressure rollers, one associated with each set of reaction rollers, and cam means common to said two pressure rollers for forcing them respectively between their sets of reaction rollers, said cam means comprising an element of truncated triangular cross-section having tapered faces adapted to run against said pressure rollers when it is moved in a direction substantially parallel to the rotational axis of the collet.

6. Operating mechanism located between two parts of a collet, of which one part is fixed to the shaft of a work-rotating machine and the other part is slidable axially of said shaft in relation to said first-mentioned part, comprising four sets of reaction rollers symmetrically located about the rotational axis of the collet with all reaction roller axes substantially perpendicular to said rotational axis, each set of reaction rollers comprising two axially parallel rollers adjacent to one another, four pressure rollers associated one with each set of reaction rollers and each pressure roller being axially parallel to and in contact with its associated reaction rollers, and cam means for simultaneously urging said pressure rollers each between the pair of reaction rollers with which it is associated.

7. Operating mechanism according to claim 6 comprising two cam devices, one common to two of said pressure rollers and the other common to the other two of said pressure rollers, for urging the pressure rollers between said associated reaction rollers.

8. Operating mechanism according to claim 6 comprising two cam devices, each including an element of truncated triangular cross-section, having tapered faces adapted to run against the pressure rollers when it is moved in a direction substantially parallel to the rotational axis of the collet, one such cam device being common to two of said pressure rollers and the other common to the other two of said pressure rollers, for urging the pressure rollers between said associated reaction rollers.

9. Operating mechanism located between two parts of a collet, of which one part is fixed to the shaft of a work-rotating machine and the other part is slidable axially of the shaft in relation to the first mentioned part, comprising a reaction roller mounted in said fixed part of the collet with its axis, when extended, intersecting the rotational axis of the collet, a reaction roller mounted in said slidable part of the collet with its axis, when extended, intersecting the rotational axis of the collet, a pressure roller axially parallel to and in contact with said reaction rollers, and means for forcing said pressure roller in a direction transverse to the axis of said pressure roller between said reaction rollers in order to move them further apart and thereby effect relative axial movement of the said collet parts in which they are mounted.

10. Operating mechanism located between two parts of a collet, of which one part is fixed to the shaft of a work-rotating machine and the other part is slidable axially of the shaft in relation to the first-mentioned part, comprising a reaction roller mounted in said fixed part of the collet with its axis, when extended, intersecting the rotational axis of the collet, a reaction roller mounted in said slidable part of the collet with its axis, when extended, intersecting the rotational axis of the collet, a pressure roller axially parallel to and in contact with said reaction rollers, and cam means for forcing said pressure roller in a direction substantially perpendicular to the axis of said pressure roller between said reaction rollers in order to move them further apart and thereby effect relative axial movement of the said collet parts in which they are mounted.

11. Operating mechanism located between two parts of a collet, of which one part is fixed to the shaft of a work-rotating machine and the other part is slidable axially of the shaft in relation to the first-mentioned part, comprising a reaction roller mounted in said fixed part of the collet with its axis substantially perpendicular to said shaft axes, a reaction roller mounted in said slidable part of the collet with its axis substantially perpendicular to said shaft axis, a pressure roller axially parallel to and in contact with said reaction rollers and means for forcing said pressure roller in a direction substantially perpendicular to the axis of said pressure roller between said reaction rollers in order to move them further apart and thereby effect relative axial movement of the said collet parts in which they are mounted.

12. Operating mechanism according to claim 10 comprising two sets of reaction rollers, two pressure rollers, one associated with each set of reaction rollers, and cam means common to said two pressure rollers for forcing them respectively between their sets of reaction rollers.

13. Operating mechanism according to claim 10 comprising two sets of reaction rollers, two pressure rollers, one associated with each set of reaction rollers, and cam means common to said two pressure rollers for forcing them respectively between their sets of reaction rollers, said cam means comprising an element of truncated triangular cross-section having tapered faces adapted to run against said pressure rollers when it is moved in a direction substantially parallel to the rotational axis of the collet.

CHARLES HARRY MOULD.

REFERENCES CITED

The following references are of record in the file of this patent:

UNITED STATES PATENTS

| Number | Name | Date |
|---|---|---|
| 2,053,020 | Bush | Sept. 1, 1936 |

FOREIGN PATENTS

| Number | Country | Date |
|---|---|---|
| 554,422 | Great Britain | July 2, 1943 |